United States Patent Office 3,300,423
Patented Jan. 24, 1967

---

3,300,423
ANTIMONY OXIDE-VINYLIDENE CHLORIDE COPOLYMER EMULSIONS
Gerald H. Brown, Syracuse, N.Y., and Emil D. Mazzarella, Plainfield, N.J., assignors to National Starch and Chemical Corporation, New York, N.Y.
No Drawing. Filed Dec. 12, 1963, Ser. No. 330,010
4 Claims. (Cl. 260—17)

This invention relates to novel emulsions for use in the preparation of fire retardant paper and textile products. More particularly, it relates to the preparation of stable antimony oxide-vinylidene chloride copolymer emulsions.

Various methods have been proposed to impart fire resistant properties to paper and textile products. Of considerable importance in flameproofing fibrous materials is the coating and/or impregnation of such materials with heavy metal oxides such as the oxides of tin, lead, antimony, arsenic, bismuth, titanium and the like. Another widely used flameproofing method comprises the treatment of paper and textiles with chlorine-containing organic compounds. Thus, polymers and copolymers derived from vinylidene chloride have been found to be of particular use in flameproofing methods. In view of the respective effectiveness of metal oxides and of vinylidene chloride polymers in flame-proofing applications, it appears reasonable to expect that a combination of these materials would produce optimum resistance to fire. Accordingly, attempts have been made to apply aqueous emulsions containing mixtures of metal oxides and vinylidene chloride polymers to materials that are to be flameproofed. Unfortunately, such attempts have generally proved unsatisfactory due to the inability to effect stable emulsion of metal oxides with vinylidene chloride polymers. Moreover, the utilization of emulsifying agents in attempts to form stable emulsions of metal oxides with vinylidene chloride polymers has proved ineffective in obtaining such emulsions. Although emulsions of vinylidene chloride polymers and of a metal oxide can be separately prepared and then admixed, the resulting mixtures are generally mechanically unstable.

In order to circumvent the aforedescribed difficulties in using metal oxide-vinylidene chloride polymer combinations, the various components of the flameproofing mixtures have been added separately to paper and textile fibers before a self-supporting sheet had been formed therefrom. Needless, to say, such separate addition of components unduly complicates the manufacturing process by multiplying the number of steps which are required. Moreover, the incompatibility of metal oxides with vinylidene chloride polymers precludes preparing such mixtures in stable aqueous emulsion form and subsequently surface treating previously formed sheets of paper and textiles with said emulsions.

It is an object of this invention to prepare stable aqueous emulsions of metal oxides with vinylidene chloride polymers. It is a further object of this invention to prepare flameproof paper, paper products, wet laid nonwoven products made of synthetic fibers, textiles and similar products. A still further object of this invention is to prepare emulsions of metal oxides with vinylidene chloride polymers which may be employed either in the actual preparation or in the subsequent treatment of paper and other articles. Various other objects and advantages of the invention will be apparent from the discussion that follows hereinafter.

In accordance with the invention, we have found a means of preparing stable, aqueous emulsions of antimony oxide-vinylidene chloride polymer mixtures. These emulsions consist essentially of a vinylidene chloride copolymer latex, a metal oxide, a protective colloid, a surface active agent, and a dispersing agent. Due to the unique combination and delicate balance of these components, the resulting emulsions are low viscosity, high solids systems which remain stable for considerable periods of time. These emulsions, when used in the preparation or treatment of paper, textile fabrics, products made from combustible fibers, and similar materials, impart flame retardant properties thereto, as well as enhanced characteristics of water resistance and strength.

The vinylidene chloride copolymers which are used to prepare the stable emulsions of this invention are aqeous latices or emulsions which must contain at least 60%, by weight, of vinylidene chloride. The vinylidene chloride may be copolymerized with at least one comonomer selected from the group consisting of: vinyl esters of carboxylic acids wherein said acids contain from 2–18 carbon atoms, alkyl esters of acrylic or methacrylic acid wherein said alkyl groups may contain from 1–18 carbon atoms; acrylonitrile; acrylamide; methacrylonitrile; vinyl chloride; dialkyl esters of unsaturated dicarboxylic acids wherein said alkyl group may contain from 1–8 carbon atoms; styrene; divinyl ethers; isoprene; alkyl vinyl ketones wherein said alkyl group may contain from 1–8 carbon atoms; butadiene; acrylic acid; methacrylic acid; fumaric acid; crotonic acid; citraconic acid; itaconic acid; maleic acid; mono-alkyl esters (i.e., acid esters) of maleic acid wherein said alkyl group may contain from 1 to 8 carbon atoms; and acid salts of maleic acid. The resin solids content of these latices are preferably in the range of from about 20% to 60% by weight.

Any of the above listed vinylidene chloride resins may be readily prepared by means of various polymerization techniques well known to those skilled in the art.

For the purposes of this invention, antimony trioxide is the antimony compound which is preferentially employed in the preparation of the novel emulsion of this invention. However, it is also within the purview of the invention to employ other compounds of antimony, such as the sulfides and chlorides, in the preparation of these stabilized emulsions.

The protective colloids used to prepare the stable emulsions of this invention function as emulsifying agents which maintain the antimony trioxide in a uniform and homogeneous suspension. For the purposes of this invention, any hydrocolloid may be employed such, for example, as starch, polyvinyl alcohol, carboxymethyl cellulose, methyl cellulose, hydroxyethyl cellulose and other water soluble cellulose derivatives, alginates, and the like.

The surfactants employed in the present invention serve the dual function of helping to maintain the antimony trioxide in suspension and of preventing the vinylidene chloride copolymer latex from becoming mechanically unstable. Any non-ionic surfactant or combination of non-ionic surfactants may be used in the preparation of the emulsions of this invention, with particularly favorable results being achieved by the use of organic phosphate esters having the structural formula

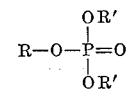

where R' is a water solubilizing group containing from 1 to 6 ethylene oxide units, and R is a medium alkyl group containing from 4 to 10 carbon atoms. Exemplary phosphate esters suitable for use as surfactants in this invention may be represented by the formula

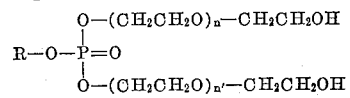

where R is a 2-ethylhexyl group, $n$ may have a value of from 0 to 2, and $n'$ may have a value of from 2 to 5. In addition to the phosphate esters described hereinabove, we have found that the non-ionic surfactants used in our emulsions may also be selected from the group consisting of fatty acid esters, such as diethylene glycol oleate, polyethylene glycol monolaurate and polyoxyethylene sorbitan monostearate; fatty acid amides, such as oleic acid isopropanolamide; and, sulfosuccinates, such as sodium dihexyl sulfosuccinate.

The dispersing agents which comprise a part of the stabilized emulsions of this invention enable low viscosity emulsions of small particle size to be obtained. These dispersing agents are generally phosphate salts of alkali or alkaline earth metals such as, for example, tetrasodium pyrophosphate, sodium hexametaphosphate, calcium pyrophosphate, sodium tripolyphosphate, potassium tripolyphosphate, and similar compounds.

The concentration of the various components which comprise our novel emulsions must be carefully controlled in order that stable emulsions can be obtained. Thus, in the emulsion there may be a concentration of vinylidene chloride copolymer solids of from about 10 to about 60%, as based on the total weight (i.e., water plus all solids) of the emulsion, with the preferred resin solids content ranging from about 20 to 30%. The amount of antimony trioxide which is employed may vary from about 10 to about 40%, as based on the total weight of the emulsion, with the preferred amount being from 20 to 30%. If amounts of antimony trioxide substantially greater than the maximum suggested limit are employed, emulsion stability is detrimentally affected, the viscosity becomes very high, and high solids emulsions cannot be obtained without a loss in flame proofing ability.

The protective colloids applicable for use in preparing the stable emulsions of this invention may be used in amounts varying from about 0.5 to about 10%, as based on the total weight of the emulsion solids. If concentrations of protective colloids substantially less than this specified lower limit are employed, the resulting emulsions will be unstable and will separate, or will be mechanically unstable when subjected to the high shear usually encountered in pumping operations. On the other hand, the use of protective colloids in amounts substantially exceeding the suggested upper limit will result in mixtures that are extremely viscous and water sensitive.

The surfactants used in preparing the emulsions of this invention may be employed in quantities ranging from about .025 to about 1.0%, as based on the total weight of emulsion solids. Use of substantially less than the specified minimum concentration of surfactants results in instability on the part of the emulsions, whereas use of amounts exceeding this suggested upper limit is deleterious to the water resistance of the products to which the emulsions may be subsequently applied.

The dispersing agents employed in the present invention may be used in amounts varying from about 0.1 to about 1.0%, by weight, of the total emulsion solids. Using substantially less dispersing agent than the amounts herein specified results in unstable emulsions due to the consequent tendency of the oxide to agglomerate. Use of amounts of dispersing agent greater than about 1.0% does not affect the stability of the emulsion, but on the other hand, offers no benefit to the practitioner.

The total solids content of our emulsions may range from about 20% to about 70%, with the preferred range being from 40% to 60%. It should be noted that the aforementioned range of total solids contents is used only to effect the preparation of stable emulsions. However, these stable emulsions, once prepared, can then be diluted to lower solids contents if their subsequent utilization requires such dilution.

It may also be desirable to include water insoluble boron compounds such as boron oxide, boron phosphate, and the like in the flame proofing emulsions of this invention in order to eliminate "afterglow" in papers and textiles which have been treated with these emulsions. Afterglow may be defined as the tendency of a material to sustain combustion upon removal of a flame from contact with said material. When these agents are added to the emulsions of this invention, they are usually employed in amounts ranging from about 1.0% to about 10%, by weight, as based on the combined total weight of the antimony compound and of the vinylidene chloride copolymer solids in the emulsion. Amounts of boron compounds greater than 10% may be used, but use of these larger quantities does not produce any significant benefit.

In preparing the stable emulsions of this invention, an aqueous slurry comprising the antimony trioxide, surfactants, and wetting agents is first prepared, whereupon an aqueous solution of a protective colloid is added thereto with agitation then being applied for a short period. To the aforedescribed mixture there is then added a vinylidene chloride copolymer latex and the resulting mixture is then agitated until it is observed to be homogeneous in its composition.

The stable emulsions of this invention can be used in numerous flame-retarding applications, such as the treatment and/or preparation of textiles, paper, wallboard, ceiling tile, asbestos, nonwoven fabrics, and similar products. These emulsions may be applied either in surface treatment or in internal addition during the preparation of the products wherein they are to be employed. In addition to flame retardation, these emulsions also impart a substantial degree of water resistance and strength to the products to which they are applied.

In the following examples, which further illustrate the embodiment of this invention, all parts given are by weight unless otherwise indicated.

*Example I*

In this example, and in the examples that follow, the identical basic procedure was utilized to prepare the emulsions of the invention. In this procedure, an aqueous slurry of antimony trioxide, surfactants, and wetting agents was first prepared, and an aqueous solution of a protective colloid was next added to the slurry with agitation then being applied for a short period. To this mixture there was then added a vinylidene chloride copolymer latex, and the entire emulsion was thereupon mixed until homogeneous in composition.

In accordance with the above described procedure, an aqueous slurry of 43.7 parts of antimony trioxide, 0.44 part of potassium tripolyphosphate, and 0.88 part of diethylene glycol oleate, in 18.7 parts of water. To this aqueous slurry was added a solution of 5.2 parts of carboxymethyl starch in 34.5 parts of water, and the resulting mixture was agitated for 30 minutes. There were then added thereto 63.2 parts of a 59% solids latex of a 75:25 vinylidene chloride:butyl acrylate copolymer, and the entire emulsion was thereupon stirred for 30 minutes.

The emulsion prepared as described hereinabove was exceedingly stable and was used to treat non woven and nonwoven fabrics made of rayon fibers and also was added to a paper stock as a wet end additive. A wet laid nonwoven fabric consisting of a mixture of nylon and Dacron fibers and wood pulp formed on a paper machine was also treated. In all instances, a product was obtained that was self-extinguishing, extremely strong, and water resistant.

*Example II*

The procedure as described in Example I hereinabove was followed in the preparation of the formulations set forth in the following table.

The concentrations of the vinylidene chloride copolymer solids and of the antimony trioxide components of these formulations are represented in the table as a percentage of the total weight of the entire emulsion; whereas, the concentrations of all of the other components are represented as a percent, by weight, of the total emulsion solids.

| Components | Formulation Number | | | | | | |
|---|---|---|---|---|---|---|---|
| | 1 | 2 | 3 | 4 | 5 | 6 | 7 |
| 75:25 Vinylidene chloride:butyl acrylate copolymer solids | 60 | 20 | | | 40 | | |
| 90:10 Vinylidene chloride:acrylic acid copolymer solids | | | 25 | | | | |
| 85:15 Vinylidene chloride:acrylonitrile copolymer solids | | | | 25 | | | |
| 60:40 Vinylidene chloride:butyl acrylate copolymer solids | | | | | | 20 | |
| 65:27:8 Vinylidene chloride:butyl acrylate:vinyl acetate copolymer solids | | | | | | | 25 |
| Antimony trioxide | 10 | 40 | 25 | 25 | 10 | 20 | 25 |
| Carboxymethyl starch | 0.5 | 10 | 5 | 4 | 5 | | |
| Carboxymethyl cellulose | | | | | | 2.5 | |
| Potassium tripolyphosphate | 0.1 | 1.0 | 0.4 | 0.5 | | | 0.4 |
| Sodium hexametaphosphate | | | | | 0.25 | | |
| Tetrasodium pyrophosphate | | | | | | 0.25 | |
| Organic phosphate ester [1] | 0.025 | 1.0 | 0.8 | | | | 0.8 |
| Polyethylene glycol monolaurate (M.W. =400) | | | | | | 0.50 | |
| Sodium dihexyl sulfosuccinate | | | | | 0.75 | | |
| Oleic acid isopropanolamide | | | | 1.0 | | | |

[1] An ester having the formula:

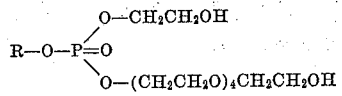

R=2 ethylhexyl.

Each of the above described formulations was exceedingly stable and was used to treat a woven and a nonwoven fabric made of combustible fibers and also was added to paper as a wet end additive and in the surface treatment of a formed paper sheet. In each instance, a product was obtained that was self-extinguishing, extremely strong, and water resistant.

*Example III*

This example illustrates the use of water insoluble boron compounds in the stable emulsions of our invention in order to eliminate "afterglow" in the products treated therewith.

In this example, aqueous emulsions were prepared utilizing the identical procedure and the formulation set forth in Example I, with the exception that water insoluble boron compounds were added to the aqueous slurry of antimony trioxide, potassium tripolyphosphate, and diethylene glycol oleate. The resulting emulsions were diluted to 14.5% solids and were used to impregnate sheets prepared from viscose rayon fibers. The sheets were then dried at 105° C. for 5 minutes and were thereafter exposed to an open flame. In each instance the sheets were found to be immediately self-extinguishing upon removal of the flame. "Afterglow" was measured by the time required for the complete disappearance of any visible glow after removal of the flame.

The boron compounds used, as well as the concentrations of such boron compounds are set forth in the following table:

| Boron Compound | Concentration of Boron Compound [1] | Afterglow (seconds) |
|---|---|---|
| None | 0 | 18.7 |
| Boron phosphate | 1 | 4.25 |
| Do | 3 | 0.50 |
| Do | 5 | 0.25 |
| Do | 10 | 0.00 |
| Boron oxide | 1 | 8.25 |
| Do | 3 | 2.25 |
| Do | 5 | 0.75 |
| Do | 10 | 0.75 |

[1] Percent based on total weight resin-antimony trioxide solids.

As can be seen from the results presented in the preceding table, the inclusion of insoluble boron compounds in our emulsions significantly reduces the amount of afterglow.

Summarizing, our invention is thus seen to provide the practitioner with stable emulsions of vinylidene chloride copolymers and metal oxides. Variations may be made in proportions, procedures and materials without departing from the scope of the invention which is limited only by the following claims.

We claim:
1. A stable aqueous emulsion of a vinylidene chloride copolymer and an antimony compound wherein the emulsifier system comprises a protective colloid, a non-ionic surfactant, and a dispersing agent selected from the group consisting of the phosphate salts of alkali and alkaline earth metals; wherein said vinylidene chloride copolymer consists of at least 60%, by weight, of vinylidene chloride; said antimony compound is selected from the group consisting of antimony trioxide, antimony trichloride, and antimony trisulfide; said non-ionic surfactant is selected from the group consisting of the alkyl esters of fatty acids, the alkyl amides of fatty acids, the sulfosuccinates, and organic phosphate esters having the structural formula

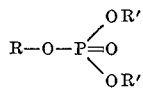

where R' is a water solubilizing group containing from 1 to 6 ethylene oxide groups and R is a medium alkyl group containing from 4 to 10 carbon atoms; wherein said protective colloid is a hydrocolloid; wherein said vinylidene chloride copolymer comprises from about 10 to about 60%, of the total weight of the emulsion; said antimony compound comprises from about 10 to about 40%, of the total weight of the emulsion; said non-ionic surfactant comprises from about 0.025 to about 1.0%, by weight of total emulsion solids; said hydrocolloid comprises from about 0.5 to about 10%, by weight of total emulsion solids; and said dispersing agent comprises from about 0.1 to about 1.0%, by weight of total emulsion solids.

2. The emulsion of claim 1 containing a water insoluble boron compound in a concentration of from about 1.0 to about 10%, as based on the combined weight of the antimony compound and of the vinylidene chloride copolymer solids in the emulsion.

3. A method of preparing stable aqueous emulsions of a vinylidene chloride copolymer and an antimony compound which comprises preparing an aqueous slurry of an antimony compound, a non-ionic surfactant, and a dispersing agent selected from the group consisting of the phosphate salts of alkali and alkaline earth metals, admixing said aqueous slurry with an aqueous solution of a protective colloid, and thereafter adding to the resulting mixture a vinylidene chloride copolymer latex; wherein said vinylidene chloride copolymer consists of at least 60%, by weight, of vinylidene chloride; said antimony compound is selected from the group consisting of antimony trioxide, antimony trichloride, and antimony trisulfide; said non-ionic surfactant is selected from the group consisting of the alkyl esters of fatty acids, the alkyl amides of fatty acids, the sulfosuccinates, and organic phosphate esters having the structural formula

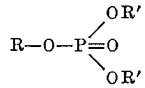

where R' is a water solubilizing group containing from 1 to 6 ethylene oxide groups and R is a medium alkyl group containing from 4 to 10 carbon atoms; wherein said protective colloid is a hydrocolloid; wherein said vinylidene chloride copolymer comprises from about 10 to about 60%, of the total weight of the emulsion; said antimony compound comprises from about 10 to about 40%, of the total weight of the emulsion; said non-ionic surfactant comprises from about 0.025 to about 1.0%, by weight of total emulsion solids; said hydrocolloid comprises from about 0.5 to about 10%, by weight of total emulsion solids; and said dispersing agent comprises from about 0.1 to about 1.0%, by weight of total emulsion solids.

4. The method of claim 3 wherein said aqueous slurry contains a water insoluble boron compound in a concentration of from about 1.0 to about 10%, as based on the combined weight of the antimony compound and of the vinylidene chloride copolymer solids in the emulsion.

References Cited by the Examiner

UNITED STATES PATENTS

| | | | |
|---|---|---|---|
| 2,684,953 | 7/1954 | Stilbert et al. | 260—29.6 |
| 2,753,318 | 7/1956 | Maeder | 260—29.6 |
| 2,886,546 | 5/1959 | Dibert et al. | 260—29.6 |

FOREIGN PATENTS 935,302   8/1963   Great Britain.

MURRAY TILLMAN, *Primary Examiner.*

J. ZIEBLER, *Assistant Examiner.*